(12) United States Patent
Klee et al.

(10) Patent No.: US 10,522,797 B2
(45) Date of Patent: Dec. 31, 2019

(54) CIRCUIT BOARD AND CHARGING DEVICE INCLUDING A CIRCUIT BOARD FOR A RECHARGEABLE BATTERY PACK

(71) Applicant: Robert Bosch GmbH, Stuttgart (DE)

(72) Inventors: Christoph Klee, Stuttgart (DE); Marcin Rejman, Waiblingen (DE); Mickael Segret, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/608,551

(22) Filed: May 30, 2017

(65) Prior Publication Data

US 2017/0352847 A1 Dec. 7, 2017

(30) Foreign Application Priority Data

Jun. 7, 2016 (DE) .................. 10 2016 209 965

(51) Int. Cl.
| | |
|---|---|
| *H01M 2/10* | (2006.01) |
| *H01M 10/48* | (2006.01) |
| *H01M 10/44* | (2006.01) |
| *F21V 33/00* | (2006.01) |
| *H02J 7/00* | (2006.01) |
| *B25F 5/02* | (2006.01) |

(52) U.S. Cl.
CPC .............. *H01M 2/1055* (2013.01); *B25F 5/02* (2013.01); *F21V 33/0084* (2013.01); *H01M 10/441* (2013.01); *H01M 10/488* (2013.01); *H02J 7/0045* (2013.01); *H02J 7/0047* (2013.01); *H02J 7/0068* (2013.01)

(58) Field of Classification Search
CPC .... B25F 5/02; F21V 33/0084; H01M 10/441; H01M 10/488; H01M 2/1055; H02J 7/0045; H02J 7/0047; H02J 7/0068
USPC ......................................................... 320/130
See application file for complete search history.

(56) References Cited

U.S. PATENT DOCUMENTS

| | | | | | |
|---|---|---|---|---|---|
| 4,161,346 | A | * | 7/1979 | Cherian et al. ...... | H01R 12/714 439/515 |
| 4,295,700 | A | * | 10/1981 | Sado .................. | H01R 13/2414 361/785 |
| 5,298,685 | A | * | 3/1994 | Bindra et al. ......... | H01R 12/52 174/250 |
| 6,224,396 | B1 | * | 5/2001 | Chan et al. ............ | H05K 3/325 439/66 |
| 8,502,089 | B2 | * | 8/2013 | Loibl et al. ........ | H01R 43/0221 174/257 |
| 9,923,249 | B2 | * | 3/2018 | Rejman ............... | H01M 10/488 |
| 2007/0090788 | A1 | * | 4/2007 | Hansford et al. ... | H01M 2/1055 320/107 |
| 2011/0156645 | A1 | * | 6/2011 | Yang ..................... | H02J 7/0042 320/110 |
| 2018/0040927 | A1 | * | 2/2018 | Rejman ................ | H01M 2/105 |
| 2018/0069208 | A1 | * | 3/2018 | Rejman .............. | H01M 2/1055 |

* cited by examiner

*Primary Examiner* — Sun J Lin

(74) *Attorney, Agent, or Firm* — Norton Rose Fulbright US LLP; Gerard Messina

(57) ABSTRACT

A circuit board, which includes at least one contact surface for electrical contacting with a contact partner, so that an electric current can be transferred between the circuit board and the contact partner, the circuit board including structures in the at least one contact area, which are designed to pierce through contaminant layers and/or oxide layers present on the at least one contact partner, the at least one contact area including the at least one contact surface.

17 Claims, 10 Drawing Sheets

CIRCUIT BOARD AND CHARGING DEVICE INCLUDING A CIRCUIT BOARD FOR A RECHARGEABLE BATTERY PACK

CROSS REFERENCE

The present application claims the benefit under 35 U.S.C. § 119 of German Patent Application No. DE 102016209965.5 filed on Jun. 7, 2016, which is expressly incorporated herein by reference in its entirety.

FIELD

The present invention relates to a circuit board, a rechargeable battery pack including a circuit board, and a charging device including a circuit board.

BACKGROUND INFORMATION

Circuit boards are generally used to electrically connect electronic components to one another and at the same time to mechanically hold them. Circuit boards are also used in order to establish an electrical contact between the circuit board and another contact partner, which is not part of the circuit board. Circuit boards include, in general, an electrically non-conductive base material, which includes a plurality of individual strip conductors. Circuit boards of this type are suitable as carriers for electronic components. The circuit boards are usually protected by a surface protector (solder resist) which, with the exception of the contact surfaces, extends over the entire circuit board surface. Virtually every electronic device includes one or more circuit boards, as do electrical hand-held power tools, rechargeable battery packs and/or charging devices for such rechargeable battery packs.

Electrical hand-held power tools are known in principle and are supplied with current via a mains connection. Alternatively, rechargeable battery devices allow for a high flexibility during work, since they are, in particular, independent of mains power. In this way, it is possible to conveniently carry out outdoor work, for example, so that when operating a hand-held power tool, it is frequently provided to use rechargeable battery packs.

Conventional rechargeable battery packs of this type generally include a large number of rechargeable batteries connected in parallel and/or in series, for example, three cylindrically-shaped lithium ion cells connected in series in a rechargeable battery housing, each having 3.6 V with a total voltage of 10.8 V, for example. The rechargeable battery housing may be coupled to the hand-held power tool in a chamber or an interface or the like of the hand-held power tool, the motor being electrically coupled to the rechargeable battery pack when coupling the two housings and supplying the energy necessary for operating a hand-held power tool.

Thus, within the scope of the present application, a rechargeable battery pack is understood to mean a rechargeable battery pack preferably made up of multiple electrically interconnected rechargeable cells, which is able to store electrical energy. The rechargeable cells are connected both via an electrical connection as well as via a mechanical connection to a circuit board of rechargeable battery pack electronics.

In principle, it is unproblematic to manufacture a circuit board having an oxide-free surface, since there are coating methods for such purpose, for example, using gold, which enable a good contactability without insulating oxides. Circuit boards of this type are expensive.

Alternatively, less precious metals may be used. In these metals, the oxide layer, frequently only a few atomic layers thick, proves to be disadvantageous, since the surface must be pretreated, for example, by chemically or mechanically removing the oxide just prior to the joining of the contact surfaces, or by coating with a chemically stable, electrically conductive layer such as, for example, a graphite layer or gold layer, in order to enable a reliable contacting.

SUMMARY

An object of the present invention is to improve upon the aforementioned disadvantages and to provide a circuit board for electronic devices, in which a largely reliable electrical connection between the circuit board and a contact partner may be ensured. It is also an object of the present invention to provide a rechargeable battery pack including a circuit board, in which a largely reliable electrical connection between the circuit board and a contact partner inside the rechargeable battery pack may be ensured. In addition, the rechargeable battery pack should have a good mountability and be preferably flexibly, cost-efficiently and simply constructed.

This object may be achieved by a circuit board in accordance with the present invention and by a rechargeable battery pack including a circuit board in accordance with the present invention. Advantageous embodiments, variants and refinements of the present invention are described herein.

According to an example embodiment of the present invention, it is provided that a circuit board includes at least one contact surface for electrically contacting a contact partner, so that an electric current may be transferred between the circuit board and the contact partner, the circuit board including structures in at least one contact area, which are designed to pierce through contaminant layers or oxide layers potentially existing on the contact partner, the contact area including the contact surface. In this way, a largely reliable electrical connection between the circuit board and a contact partner may be ensured.

In one particularly preferred specific embodiment, the electrically conductive contact surface includes divided, web-like strip conductor structures. In this way, the contact geometry of the circuit board is selected in such a way that the constructionally existing contact pressure of the contact surface on the contact partner is distributed on a preferably small surface, as a result of which a higher contact pressure between the contact surface and the contact partner is achieved. In addition, the available contact area on the contact surface is advantageously utilized in this way in that multiple small contact points on the electrically conductive, divided, web-like strip conductor structures may be redundantly used, as a result of which even under difficult contact conditions the likelihood increases that at least one of the contact points makes reliable contact between the circuit board and the contact partner.

At least a part of the web-like strip conductor structures is advantageously designed with sharp-edged border areas, which are suitable for piercing through the potentially existing contaminant layers and/or oxide layers during a relative movement of the contact partner along the contact area and/or with minimal contact pressure between the contact surface and the contact partner. The border areas of the web-like strip conductor structures are thus shaped in such a way that corners form on which the contact pressure is particularly high.

It may further be provided that the web-like strip conductor structures are situated exposed relative to at least one area on the circuit board immediately surrounding the web-like strip conductor structures, as a result of which the web-like strip conductor structures are at least partially or wholly removed from the immediately surrounding areas on the circuit board, so that these are unable to absorb any force and the available contact pressure is distributed preferably thoroughly on the contact geometry between the contact surface and the contact partner.

According to the present invention, it is provided that the circuit board further includes material-removing structures, the material-removing structures being suitable for at least partially removing the contaminant layers and/or oxide layers potentially existing on the contact partner during a relative movement of the contact partner along the contact area. In this way, an oxide or a contamination on the contact partner is mechanically removed already during the joining process with the aid of the material-removing structures on the circuit board.

The material-removing structures are advantageously not used to conduct electric current, so that copper structures, for example, which are neither electrically connected to other copper structures nor carry current, may be used as material-removing structures.

In one advantageous embodiment variant, the circuit board includes at least one first electrically non-conductive base layer, at least one second conductive layer, preferably made of copper and/or a copper alloy, the second conductive layer being applied to a first surface of the first electrically non-conductive layer, and at least one third layer made, in particular, of a solder resist, the third layer being applied to a first surface of the second conductive layer; the material-removing structures being formed by at least one of the three layers which make up the structure. The circuit board preferably has no third layer in the contact area, since the third layer generally has no electrically conductive function.

It is preferably provided that the material-removing structures are formed by recesses in the first layer, the recesses having, in particular, the shape of round holes, the edges of these holes roughening the contact partner.

Alternatively, it is also possible that the material-removing structures are formed at least partially by exposing isolated areas in the second layer, the isolated areas being, in particular, triangular-shaped and thus acting like a rasp. The contact surface advantageously includes the tips in the joining direction, so that the tips rupture the surface of the contact partner during joining in a plow-like manner, as a result of which the contaminant layers and/or oxide layers on the contact partner are at least partially removed.

In one advantageous embodiment variant, the material-removing structures are formed at least partially by recesses in the third layer, the recesses having, in particular, the shape of round holes. This has the advantage that the mechanical tensile strength of the composite is weakened less, since it is only the rims or edges of the recesses in any case which act and roughen the contact partner. Advantageously, no conductive second layer or no conductive material such as, for example, copper, is present in the area of the recesses.

Alternatively, it is also possible that the material-removing structures are formed by all layers that make up the structure if they are situated in areas which are not used for assembling or accommodating electrical components.

In one advantageous embodiment, the material-removing structures are formed at least partially by sharp-edged, granular elements in the conductive second layer, an adhesive surface between the granular elements and the first layer being dimensioned in such a way that the granular elements are sheared off during a relative movement of the contact partner along the contact area, and come to rest at least partially between the contact surface and the contact partner, where they pierce through the contaminant layers and/or oxide layers. Thus, the material-removing structures have a small dimension in the area of the second conductive layer, for example, of a copper layer, in such a way that their adhesive surface relative to the first layer carrier layer is sheared off during a parallel joining under high contact pressure between the contact surfaces of the contact partners, and come to rest at least partially between the contact surfaces of the contact partners, bite into the contact surfaces of the circuit board and of the contact partner and penetrate the contaminant layers and/or oxide layers.

In one particularly advantageous embodiment variant, the circuit board is a flexible, in particular, pliable circuit board, at least in sections, as a result of which it may be ensured that the circuit board may also be geometrically variably installed in various housings and/or in various application areas. In addition, multiple different electrical components may be positioned on the flexible circuit board, which are normally situated locally separate from one another.

The circuit board according to the present invention may also be provided in a rechargeable battery pack. Accordingly, a rechargeable battery pack for a hand-held power tool also forms an additional subject matter of the present invention. The rechargeable battery pack includes a rechargeable battery pack housing having at least one first housing component and one second housing component. The rechargeable battery pack housing accommodates at least one rechargeable cell and rechargeable battery electronics having at least one contact element for establishing an electrical connection between the rechargeable battery pack and the hand-held power tool. According to the present invention, it is provided that the rechargeable battery electronics includes at least one circuit board according to the present invention.

The contact element is advantageously connectable to the circuit board via the contact partner, the contact partner being situated on the first housing component in such a way that when connecting the first housing component to the second housing component, the contaminant layers and/or oxide layers are pierced through during a relative movement of the contact partner along a contact area of the circuit board.

It is further provided that when connecting the first housing component to the second housing component, the movement direction of the contact partner is oriented at such an angle to the circuit board, that a sliding movement of the contact partner on the contact surface results when the contact partner is seated on the contact surface, so that the contaminant layers and/or oxide layers are pierced through. In this way, it may be ensured that in a joining process oriented not vertically but rather horizontally between the circuit board and the contact partner, an oxide layer and/or contaminant layer potentially existing on the contact partner is removed.

In one particularly advantageous embodiment, a centering effect is exerted between the contact surface of the circuit board and the contact partner when connecting the first housing component to the second housing component in such a way that the contaminant layer and/or oxide layer are pierced through with a minimal contact pressure between the contact surface of the circuit board and the contact partner. It is particularly advantageous in this case that the contact partner is designed as a guided spring contact.

The object may be achieved by a charging device for a rechargeable battery pack of a hand-held power tool. Accordingly, a charging device for a rechargeable battery pack also forms an additional subject matter of the present invention. The charging device includes a housing for accommodating charging device electronics and an interface situated on the housing, which has mating contact elements for electrical and/or mechanical contacting of the contact elements of the rechargeable battery pack, the housing including at least one first housing component and at least one second housing component. The mating contact elements are each connected to the charging device electronics via at least one contact partner, the charging device electronics including at least one circuit board according to the present invention.

The circuit board according to the present invention may also be provided in a tool system, so that a tool system, including a charging device for charging a rechargeable battery pack of a hand-held power tool, also forms an additional subject matter of the present invention. Hand-held power tools include, in general, a housing having a handle, a drive motor situated in the housing for driving a mechanical interface, first electronics situated in the housing and a rechargeable battery pack detachably connectable to the hand-held power tool, the rechargeable battery pack being electrically connected to the hand-held power tool and/or to the charging device in the installed state.

The circuit board may, for example, include multiple electrical components, in particular, at least one actuating element, at least one LED display, at least one temperature sensor and/or other surface-mounted elements, surface-mounted elements (surface mounted devices, SMD for short) enabling the assembly density on a circuit board to be increased and the circuit board to be virtually arbitrarily expanded, for example, with a connection of an inductive charging device module including additional power lines and signal lines.

Various rechargeable battery types having different materials may be used as rechargeable cells for a rechargeable battery pack such as, for example, lithium-ions (Li-ion), nickel-cadmium (NiCd), nickel-metal hydride (NiMH) or lithium-polymer (LiPo), different structural shapes, for example, round, prismatic or angular, or other alternative systems such as, for example, fuel cells. Lithium-ion cells, in particular, are preferably used, since with lithium-ion cells, in particular, it is possible to combine multiple rechargeable cells to form blocks of rechargeable cells, in which multiple rechargeable cells are connected in parallel. It is particularly advantageous in this case if the cell holder is able to accommodate rechargeable cells having various diameters and lengths, as a result of which the use of the cell holder or of the cell carrier may be achieved in different rechargeable battery packs.

The installation or assembly of the housing elements of the rechargeable battery pack, the positioning and installation of various contact elements, in particular, the installation of the contact partner, of the circuit boards, of the cabling and of the entire rechargeable battery electronics inside the rechargeable battery housing is improved considerably with the aid of the described optimized design of the rechargeable battery pack according to the present invention.

A hand-held power tool is generally intended to mean all hand-held power tools including a tool carrier that may be set in motion, for example, set to rotate and/or to vibrate, which is driveable by a drive motor such as, for example, baton screw drivers, cordless drills, percussion drills, multifunctional tools, hand-held vacuum cleaners, agitators and/or screw drills. Transfer of electrical energy in this context is intended to mean, in particular, that the hand-held power tool is supplied with energy via a rechargeable battery and/or a power cable connection.

An electric motor is intended generally to mean all types of electrical consumers such as, for example, an EC motor, a linear drive, a lamp, a pump, a fan, a compressor or the like. The advantage of brushless EC motors is, among other things, that on the one hand they are practically maintenance-free and, due to their high efficiency, enable a longer operating period per battery charge during a rechargeable battery operation, as a result of which they are particularly efficient. In addition, hand-held power tools having EC motors may be constructed to be very compact and light, in which case it is particularly advantageous that also less heat loss occurs, as a result of which the devices do not become as hot as comparable devices, and are therefore more durable.

Additional features, potential applications and advantages of the present invention result from the following description of the exemplary embodiments of the present invention, which are depicted in the figures. It should be noted here that the features depicted are merely descriptive in character and may also be used in combination with features of other refinements described above, and are not intended to restrict the present invention in any form.

BRIEF DESCRIPTION OF THE DRAWINGS

The present invention is explained in greater detail below with reference to preferred exemplary embodiments, identical reference numerals being used for identical features.

DETAILED DESCRIPTION OF EXAMPLE EMBODIMENTS

Figure 1:
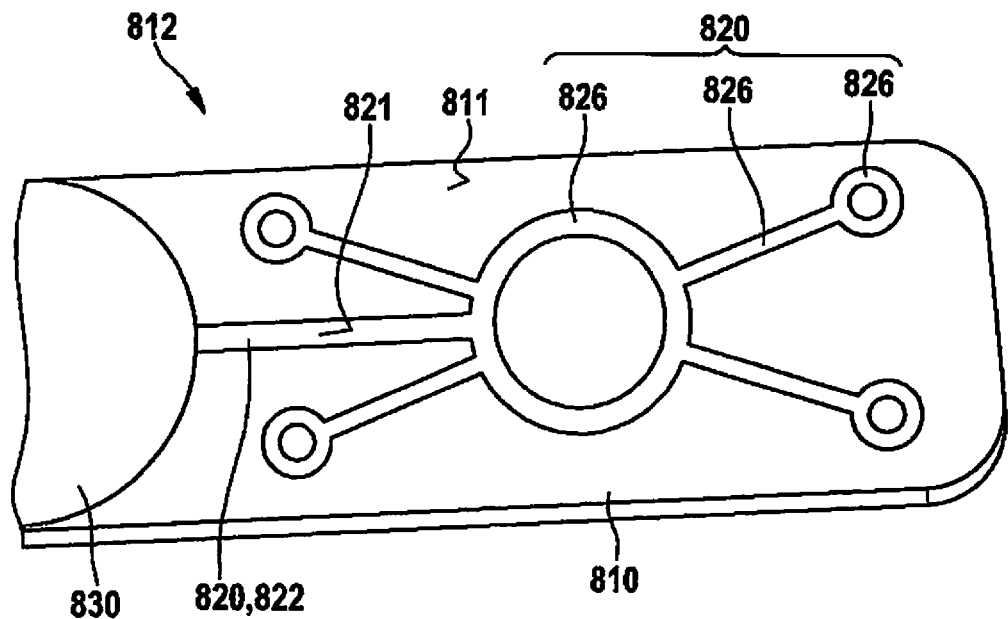
FIG. 1 shows a perspective view of a first specific embodiment of a contact area of a circuit board according to the present invention.
Figure 2:
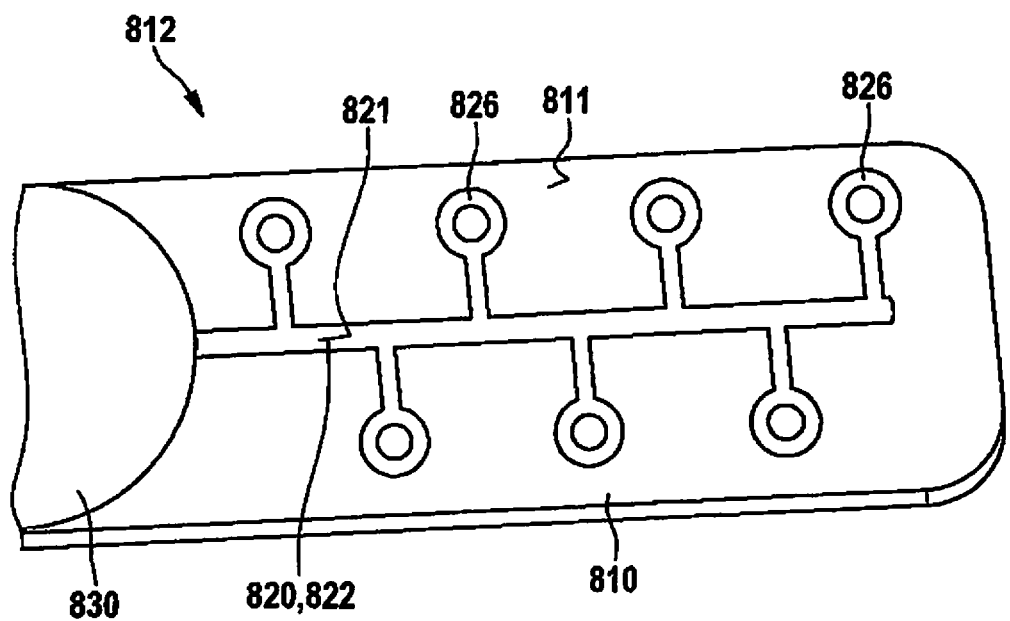
FIG. 2 shows a perspective view of a second specific embodiment of a contact area of a circuit board according to the present invention.
Figure 3:
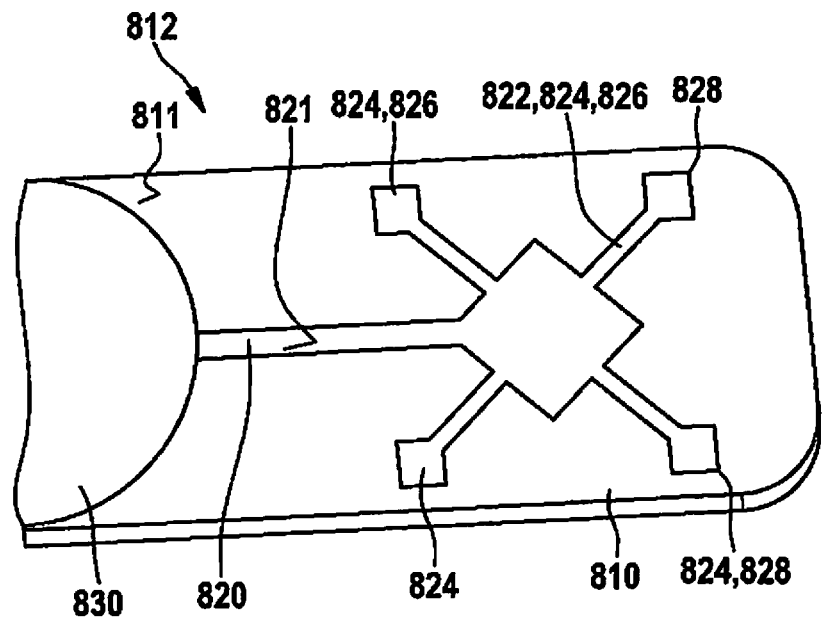
FIG. 3 shows a perspective view of a third specific embodiment of a contact area of a circuit board according to the present invention.

FIG. 1 shows a contact area of a circuit board 812 according to the present invention. The multilayer construction of circuit board 812 is clearly apparent. A first layer 810 forms a first electrically non-conductive base layer. A second conductive layer 820 is made preferably of copper and/or of a copper alloy. This second conductive layer 820 is applied to a first surface 811 of first electrically non-conductive base layer 810. A third layer 830 made, in particular, of solder resist is applied to a first surface 821 of second conductive layer 820, the contact area for a contact partner 149 not depicted in FIGS. 1 through 10 not including a third layer 830. The contact area of circuit board 812 further includes at least one contact surface 822 for electrical contacting with contact partner 149, so that an electric current may be transferred between circuit board 812 and contact partner 149. According to the present invention, it is provided that circuit board 812 includes structures in the contact area, which are designed to pierce through contaminant layers and/or oxide layers present on contact partner 149.

These structures may be formed in the contact area in various embodiment variants adapted to the respective circuit board 812 and to its use, so that FIGS. 1 through 10 are merely a small selection of these embodiment variants.

In principle, the structures as shown in FIGS. 1 through 5 may be divided, web-like strip conductor structures 826 of contact surface 822. In this case, at least a part of the web-like strip conductor structures 826 is designed with sharp-edged border areas 828, which are suitable for piercing through contaminant layers and or oxide layers potentially existing on contact partner 149 with minimal contact pressure between contact surface 822 and contact partner 149. It is advantageous in this case if web-like strip conductor structures 826 are situated exposed at least relative to an area on circuit board 812, which immediately surrounds web-like strip conductor structures 826. Thus, FIGS. 1 through 3 each show a configuration, in which the contact pressure is distributed to few contact points of contact surface 822, a somewhat different, radial configuration being depicted in each of FIGS. 1 and 3 and a web-like strip conductor structure 826 or structure of contact surface 822 being depicted in FIG. 2.

As depicted in FIGS. 4 through 10, circuit board 812 may also include material-removing structures 824, which are suitable for at least partially mechanically removing the contaminant layers and/or oxide layers on contact partner 149 during a relative movement of contact partner 149 along the contact area. Material-removing structures 824 are advantageously not used to conduct electric current.

Figure 4:
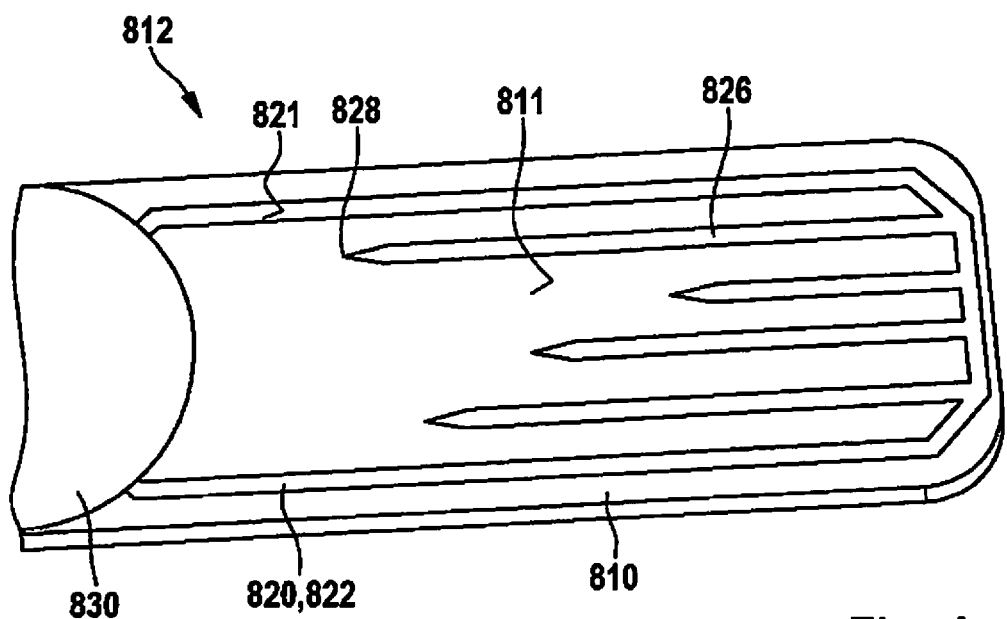
FIG. 4 shows a perspective view of a fourth specific embodiment of a contact area of a circuit board according to the present invention.
Figure 5:
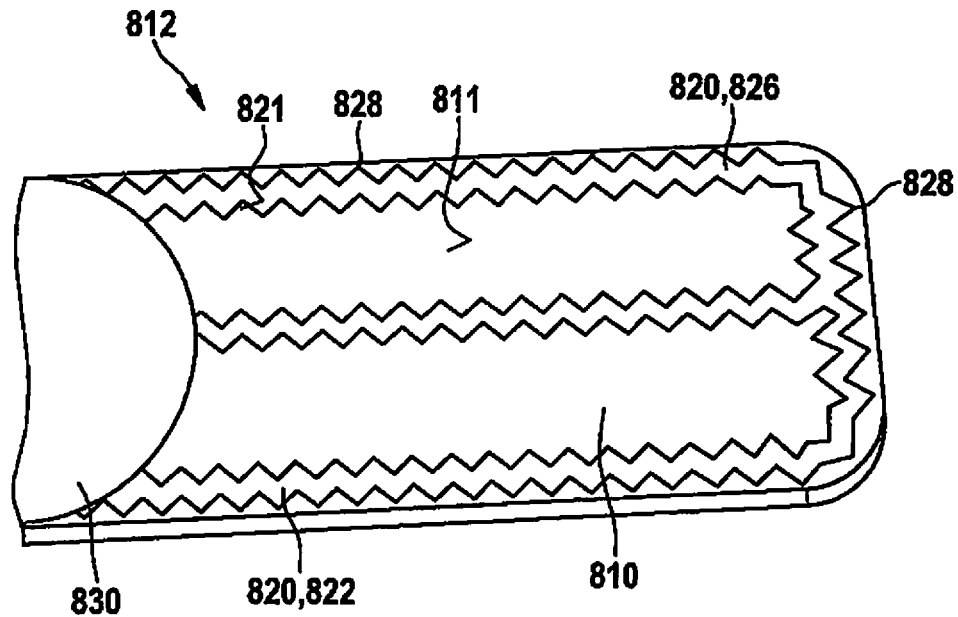
FIG. 5 shows a perspective view of a fifth specific embodiment of a contact area of a circuit board according to the present invention.

In FIGS. 4 and 5, at least a part of web-like strip conductor structures 826 is designed with sharp-edged border areas 828. In this case, the sharp-edged, material-removing border areas 828, in particular, are suitable for mechanically removing the contaminant layers and/or oxide layers on contact partner 149 during a relative movement of contact partner 149 along the contact area, whereas web-like strip conductor structures 826 are suitable for piercing through the contaminant layers and/or oxide layers with minimal contact pressure between contact surface 822 and contact partner 149. Thus, for example, the contact surface 822 of the variant depicted in FIG. 4 includes tips in the joining direction, so that the tips rupture the surface of contact partner 149 in a plow-like manner during a relative movement of contact partner 149 along the contact area, as a result of which the contaminant layers and/or oxide layers on contact partner 149 are at least partially removed.

The embodiment variants depicted in FIGS. 6 through 10 are also a combination of material-removing structures 824 and web-like strip conductor structures 826, the individual specific embodiments each differing in the configuration and the manner of material-removing structures 824 and/or in the configuration of web-like strip conductor structures 826.

Figure 6:
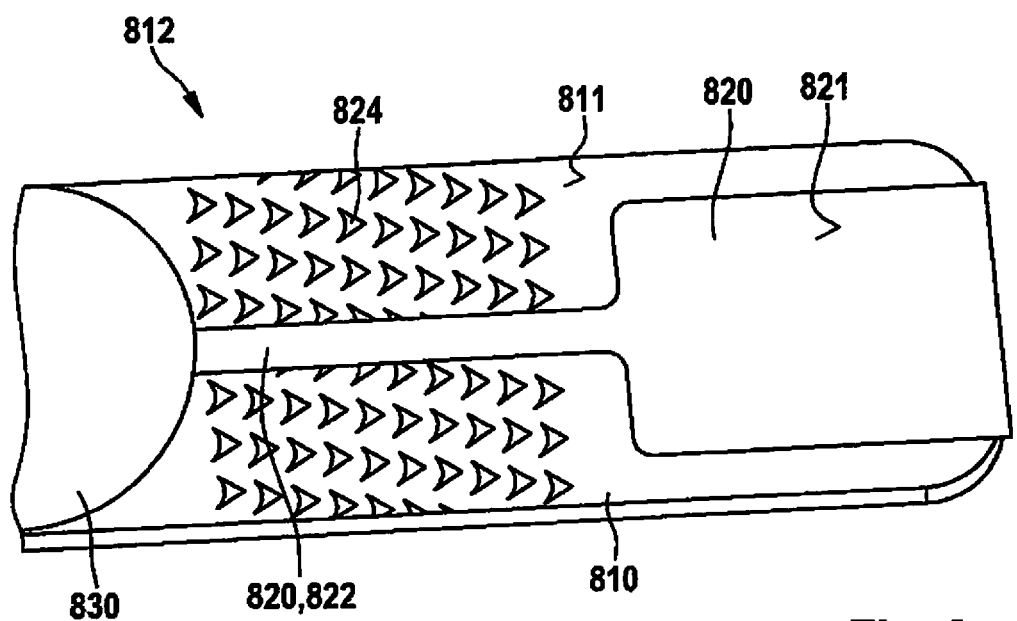
FIG. 6 shows a perspective view of a sixth specific embodiment of a contact area of a circuit board according to the present invention.
Figure 7:
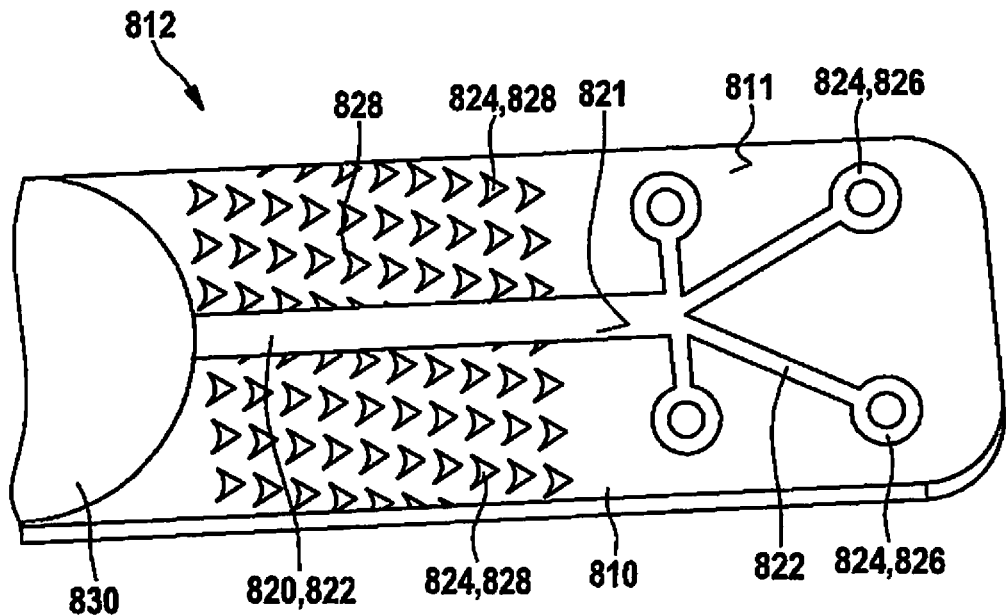
FIG. 7 shows a perspective view of a seventh specific embodiment of a contact area of a circuit board according to the present invention.
Figure 8:
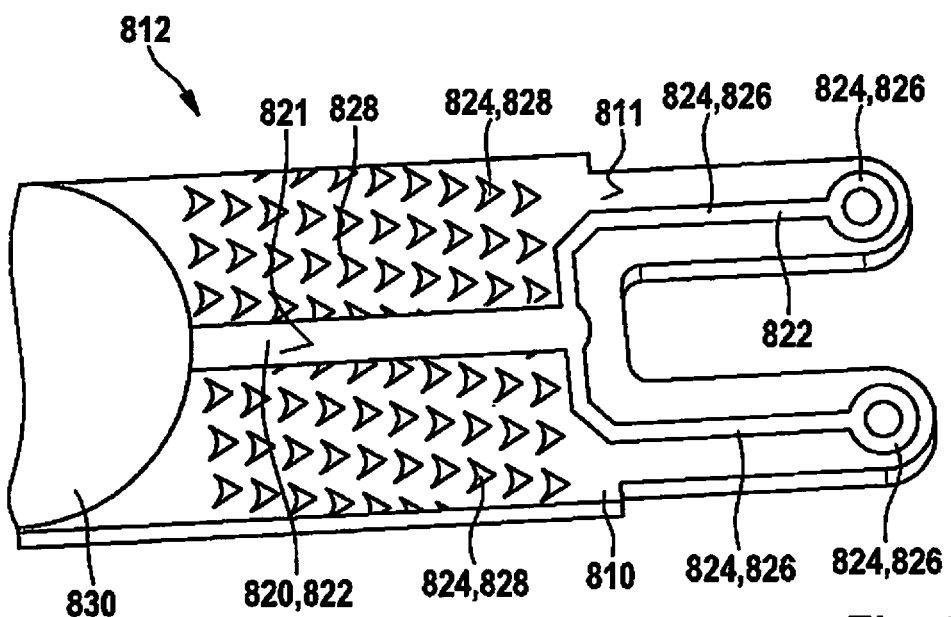
FIG. 8 shows a perspective view of an eighth specific embodiment of a contact area of a circuit board according to the present invention.

Thus, FIGS. 6 and 7 show, in particular, material-removing structures 824 in the form of upstream, partially exposed isolated areas in second layer 820, which have a triangular-shaped or rasp-like design. In contrast to the embodiment variant depicted in FIG. 6, the embodiment variants depicted in FIGS. 7 and 8 each also include a web-like strip conductor structure 826, as a result of which the contact pressure is distributed to few contact points on contact surface 822.

Figure 9:
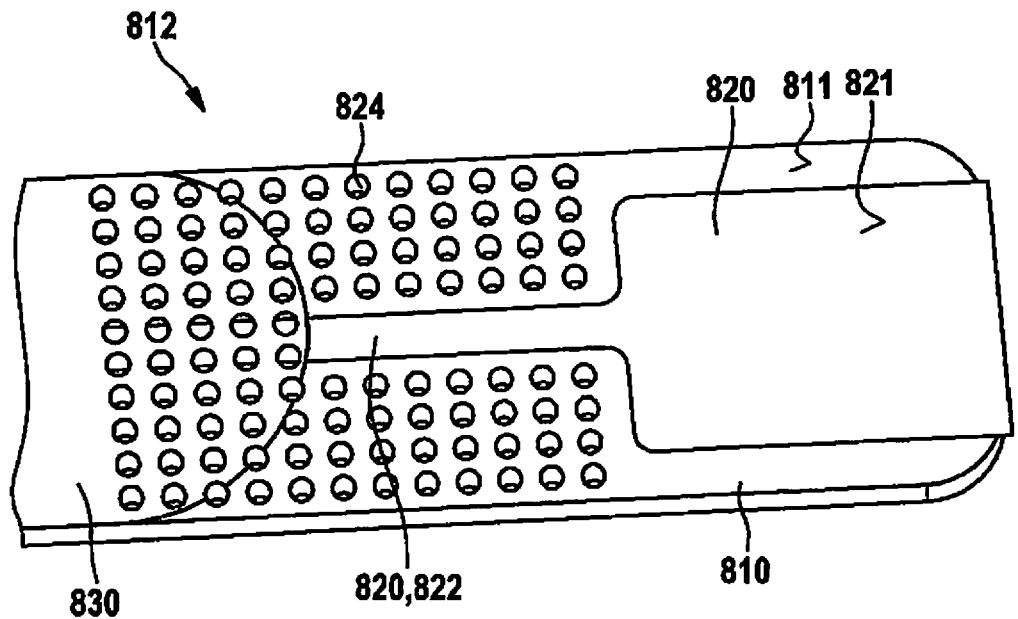
FIG. 9 shows a perspective view of a ninth specific embodiment of a contact area of a circuit board according to the present invention.

In the embodiment variant depicted in FIG. 9, material-removing structures 824 are formed by recesses in first layer 810, the base layer of circuit board 812. The recesses in the variant depicted in FIG. 6 have the shape of round holes, the edges of which roughen the contact partner during joining.

Figure 10:
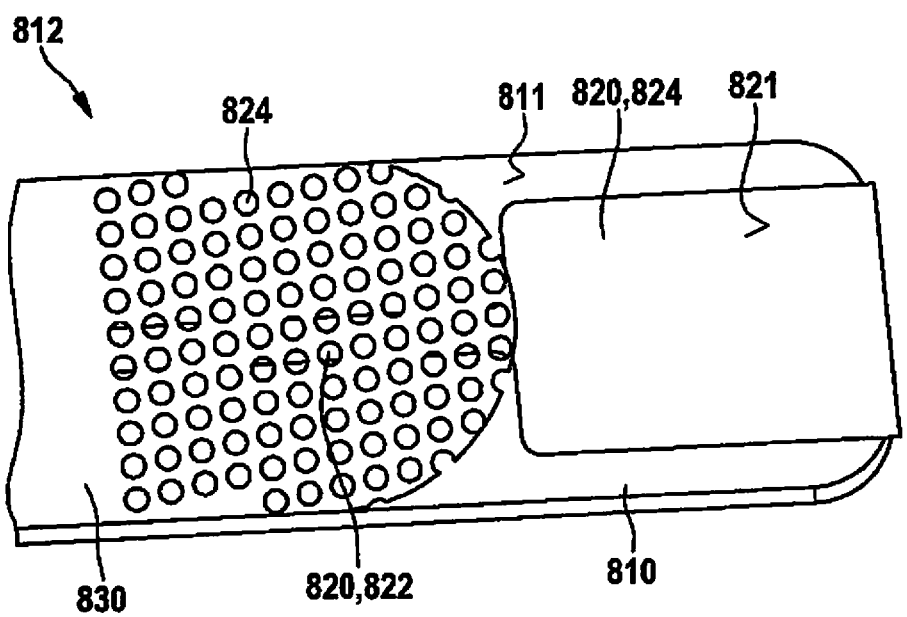
FIG. 10 shows a perspective view of a tenth specific embodiment of a contact area of a circuit board according to the present invention.

In contrast, material-removing structures 824 in the embodiment variant depicted in FIG. 10 are formed at least partially by recesses in third layer 830, these recesses in the specific embodiment shown here also having the shape of round holes, the edges of which mechanically roughen the contaminant layers and/or oxide layers on contact partner 149 during a relative movement of contact partner 149 along the contact area. The configuration of material-removing structures 824 in third layer 830 also has the advantage that the mechanical tensile strength of the circuit board composite is weakened less. It is advantageous in this case if no second, conductive layer 820 or no conductive material such as, for example, copper, is situated in the area of material-removing structures 824 or of the recesses.

Figure 11:
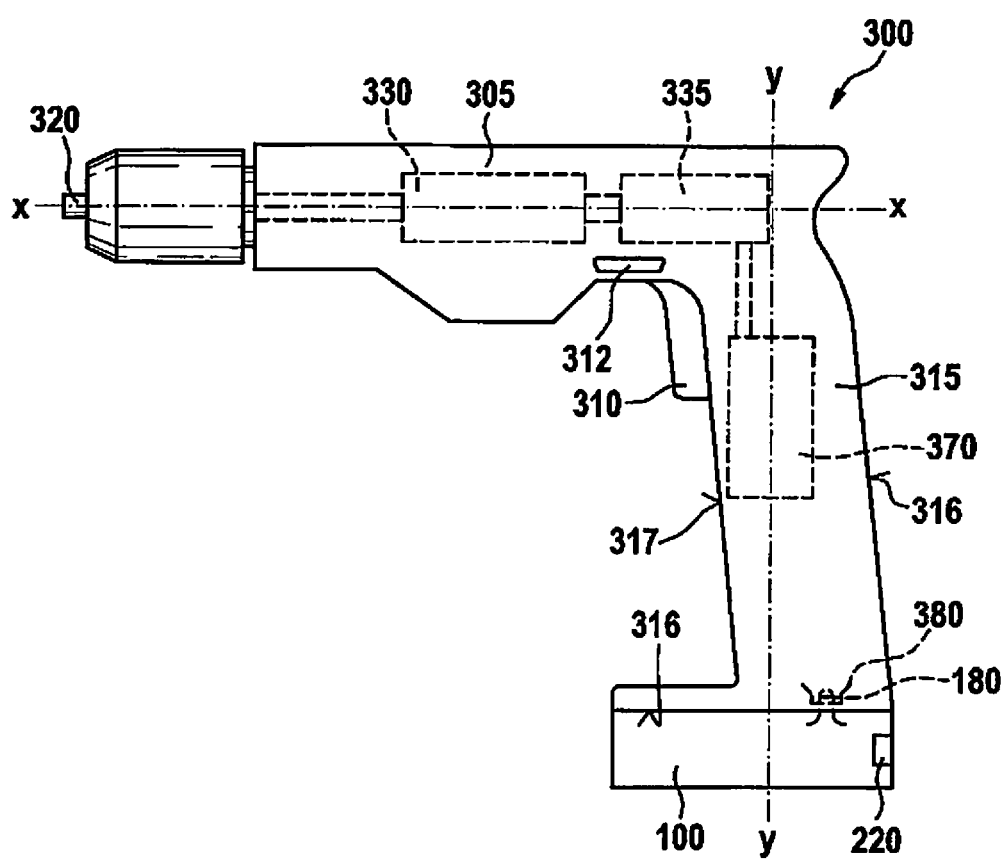
FIG. 11 shows a side view of a hand-held power tool including a rechargeable battery pack according to the present invention.

FIG. 11 shows an electrical device designed as a hand-held power tool 300, which is designed by way of example as a cordless screw drill. Accordingly, hand-held power tool 300 in the specific embodiment depicted is connected mechanically and electrically to a rechargeable battery pack 100 for battery-supplied power. It is noted, however, that the present invention is not limited to a cordless screw drill, but rather may be used in different hand-held power tools 300, regardless of whether it operates with a rechargeable battery pack 100 for battery-supplied power as depicted, or for mains-supplied power. Hand-held power tool 300 includes a transmission 330 situated in a housing 305 for transferring a torque generated by a drive motor 335 to a drive shaft rotating about an axis x, to which a tool receptacle 320 for a tool not depicted is fastened, and a handle 315. Electronics 370, which are in electronic and mechanical contact with drive motor 335 and/or transmission 330, are situated inside housing 305. Handle 315 serves as a support surface for a hand of an operator of hand-held power tool 300 and generally includes a longitudinal axis y, a front side 317, which points along an axis x in the direction of tool receptacle 320, a rear side 316 and two side surfaces 318.

A first control element 310 for the energy supply of drive motor 335 is situated in the area of handle 315, first control element 310 protruding from housing 305 manually accessible to the user, so that a control and/or regulation of the drive motor preferably as a function of the adjustment path of first control element 310 may be enabled in a known manner by a pressure movement of first control element 310, and the voltage supply for drive motor 335 may also be switched on and/or off. Hand-held power tool 300 also includes a second control element 312 in the form of a sliding switch for adjusting the rotation direction of drive motor 335 of hand-held power tool 300. Second control element 312 is slidably situated perpendicular to the rotation axis x of the drive shaft, in particular, to tool receptacle 320 of hand-held power tool 300, so that second control element 312 when actuated may be moved back and forth between a first position, a second position and a third position. In the process, the first position and second position each establish a rotation direction of the driver motor. Thus, the user of hand-held power tool 300 may recognize in which operating mode hand-held power tool 300 is operating, based just on the positions of second control element 312. In addition, the second control element includes a third position between the first position and the second position, for example, a middle position, an electrical, electromechanical and/or mechanical disruption of the motor current taking place in the third position. Thus, for example, the control of first switch element 310 may be mechanically blocked, second control element 312 acting to lock first switch element 310 when moved into a third position. In this case, second control element 312 as depicted, may be designed as a sliding switch or alternatively as a toggle switch.

First control element 310 and second control element 312 are situated along rotation axis x in such a way that it is possible to actuate both first control element as well as second control element 310, 312 using the index finger or middle finger. The spacing between first control element 310 and second control element 312 in this case is selected in such a way that one-handed operation of hand-held power tool 300 is possible. Furthermore, both control elements 310, 312 are situated in an area below rotation axis x and project from housing 305.

In the position shown in FIG. 11, rechargeable battery pack 100 is fastened to handle 315 of hand-held power tool 300 and locked by locking means. The operation of hand-held power tool 300 is not disrupted by situating rechargeable battery pack 100 below handle 315. The locking means not depicted in detail include, among other things, a locking element and an actuating element 220. Rechargeable battery pack 100 may be released from handle 315 of hand-held power tool 300 by actuation of actuating means 200. Hand-held power tool 300 also includes an interface 380.

Rechargeable battery pack 100 depicted in FIG. 11 is implemented as a sliding rechargeable battery pack, and includes an interface 180 corresponding to interface 380 of hand-held power tool 300. An implementation as a rotating or swiveling rechargeable battery pack is also possible as an alternative to the sliding rechargeable battery pack, whereby rechargeable battery pack 100 may be detachably locked on the side opposite the swivel axis by latching, screwing, clamping or bracing to housing 305 of hand-held power tool 300. In this way, a potential falling of the rechargeable battery pack off housing 305 may be effectively counteracted.

To detachably mount rechargeable battery pack 100 on a hand-held power tool 300 or on a charging device 700, rechargeable battery pack 100 includes an interface 180 for detachable mechanical or electrical connection to a corresponding interface 380 of hand-held power tool 300 or to a corresponding interface 780 of charging device 700. When mounting rechargeable battery pack 100, receiving means, for example, guide grooves and guide ribs, of hand-held power tool 300 or of charging device 700 for receiving the corresponding guide elements of rechargeable battery pack 100 are engaged with these guide elements, rechargeable battery pack 100 being introduced along the receiving means, and interface 180 of rechargeable battery pack 100 is slid into corresponding interface 380 of hand-held power tool 300 or into corresponding interface 780 of charging device 700. Rechargeable battery pack 100 may be assigned to hand-held power tool 300 and/or to charging device 700 via interfaces 180, 380.

Figure 12:
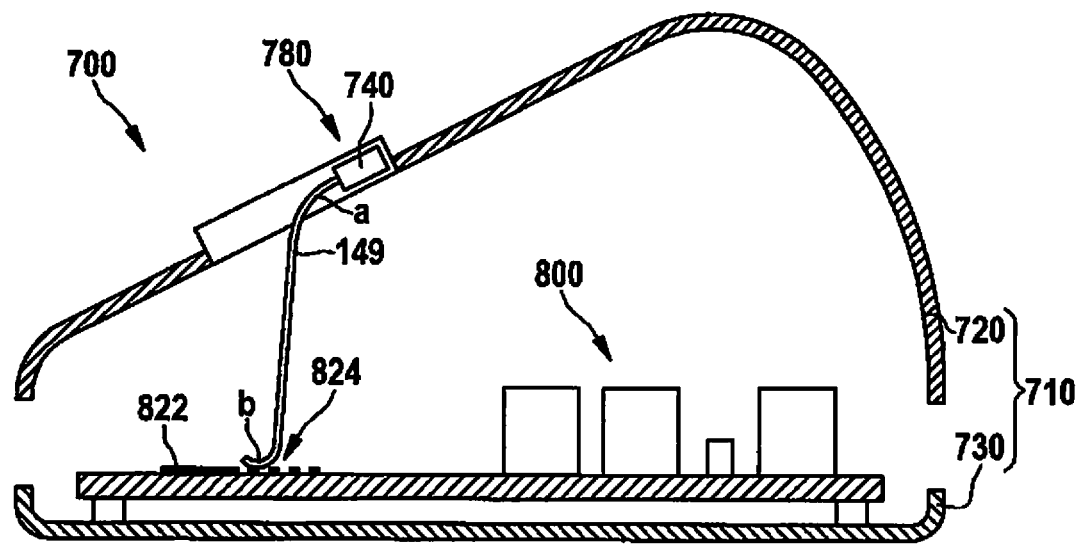
FIG. 12 shows a side view of a charging device according to the present invention including not yet connected housing components.
Figure 13:
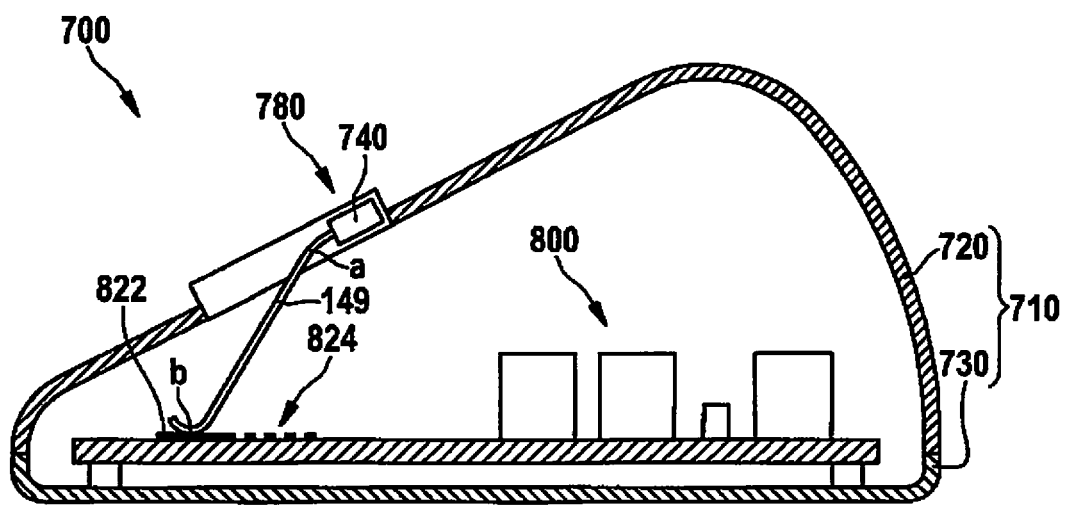
FIG. 13 shows a side view of a charging device according to the present invention including connected housing components.

FIGS. 12 and 13 show various views of a charging device 700, which may be used in a tool system of the present invention. The charging device includes a housing 710 having a first housing component 720 and a second housing component 730. Charging device electronics 720 having a circuit board 812 are situated inside housing 710.

To detachably mount charging device 700 on a rechargeable battery pack 100, the charging device includes an interface 780 for mechanical and electrical connection with corresponding interface 180 of rechargeable battery pack 100. When mounting rechargeable battery pack 100, receiving means, for example, guide grooves and guide ribs, of charging device 700 for receiving the corresponding guide elements of rechargeable battery pack 100 are engaged with these guide elements, rechargeable battery pack 100 being introduced in a contacting direction along the receiving means, and interface 180 of rechargeable battery pack 100 is slid into corresponding interface 780 of charging device 700. Rechargeable battery pack 100 may be assigned to interface 780 of battery charging device 700 via interfaces 180.

Charging device 700 according to the present invention depicted in FIGS. 12 and 13 also includes charging device electronics 720, including at least one, preferably however a plurality of mating contact elements 740 for establishing an electrical connection between rechargeable battery pack 100, charging device 700 and a circuit board 812. Each mating contact element 740 is connected to circuit board 812 inside housing 710 via a tongue-shaped contact partner 149, tongue-shaped partner 149 being connected with its first end a to mating contact element 740. Contact partner 149 is situated inside housing component 720 in such a way that the contaminant layers and or oxide layers are pierced through due to a relative movement of contact partner 149 along a contact area of circuit board 812 when first housing component 720 is connected to second housing component 730. In order to ensure this, contact partner 149 is designed as a guided spring contact, contact partner 149 being situated at such an angle to circuit board 812 that a sliding movement of contact partner 149 on contact surface 822 results when seating contact partner 149 on circuit board 812, so that the contaminant layers and/or oxide layers are pierced through. To ensure a good sliding movement, it is provided that second end b of tongue-shaped contact partner 149 is designed bent in such a way that it is curved toward contact surface 822 of circuit board 812.

When joining first housing component 720 together with second housing component 730, contact surface 822 of circuit board 812 is pressed against contact partner 149. A relative movement of contact partner 149 occurs along the contact area of circuit board 812. Material-removing structures 824 situated in the contact area of circuit board 812 are suitable for at least partially mechanically removing the contaminant layers and/or oxide layers on contact partner 149, as a result of which a reliable electrical contact may be ensured between contact surface 822 of circuit board 812 and contact partner 149 and, therefore, mating contact elements 740. Since second end b of tongue-shaped contact partner 149 is flexibly designed, second end b engages in the relatively soft copper coating on contact surface 822 of circuit board 812 and thereby forms a solid and durable contact between contact partner 149 and contact surface 822 of circuit board 812.

In one alternative embodiment variant, connecting first housing component 720 to second housing component 730 causes no parallel shift between circuit board 812 and contact partner 149, rather first housing component 720 is seated on second housing component 730 perpendicular to the surface of circuit board 812. Due to the previously described contact surface geometry on circuit board 812, the constructively existing contact pressure of contact surface 822 on contact partner 149 is distributed on a preferably small surface area in such a way that a centering effect is exerted between contact surface 822 of circuit board 812 and contact partner 149, as a result of which the contaminant layers and/or oxide layers are pierced through with a minimum contact pressure between contact surface 822 of circuit board 812 and contact partner 149.

Figure 14:
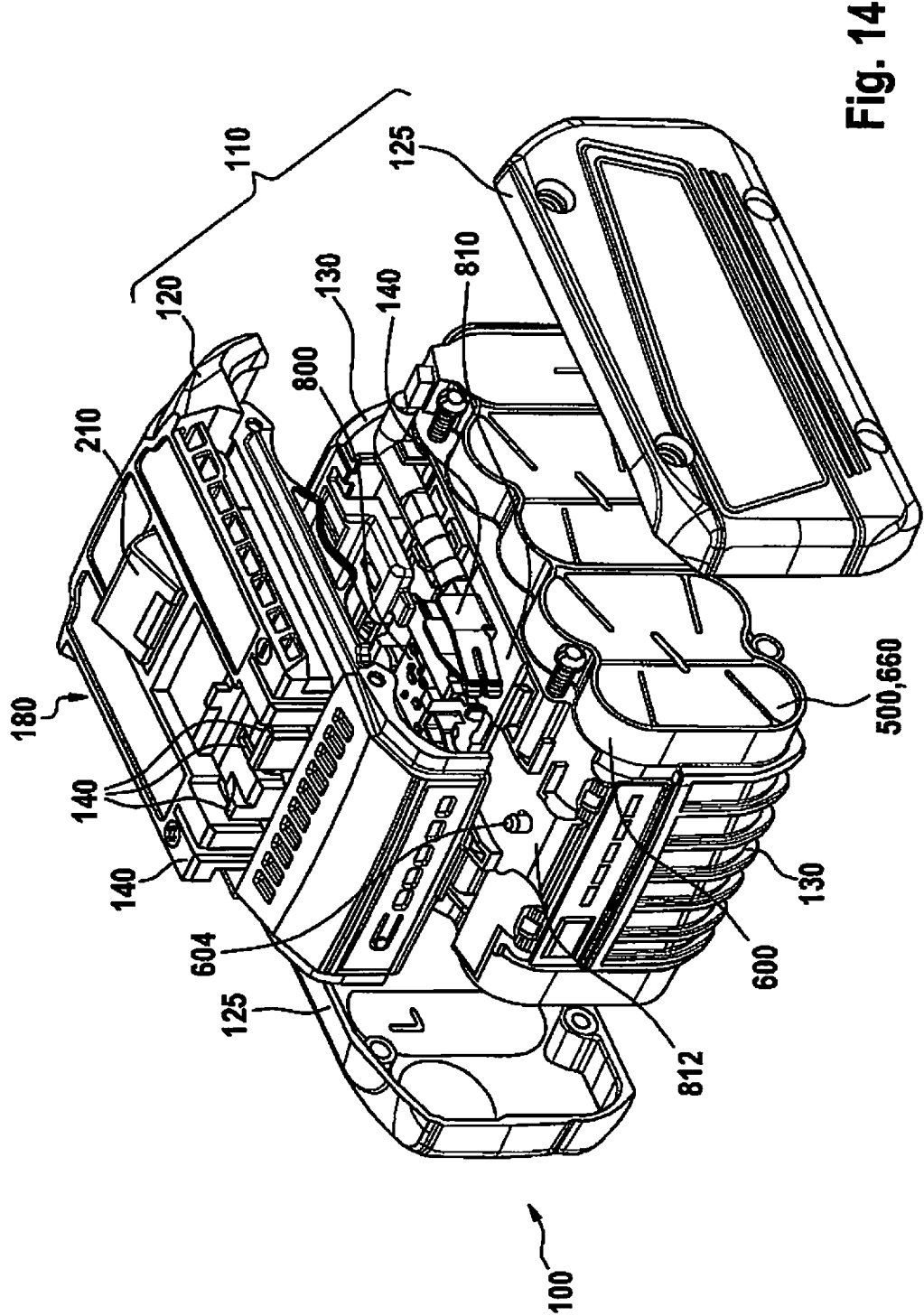
FIG. 14 shows a perspective exploded view of a rechargeable battery pack according to the present invention.

FIG. 14 shows a rechargeable battery pack 100 in an exploded view. Rechargeable battery pack 100 includes a housing 110 made of a first upper housing component 120, a second lower housing component 130 and two additional lateral housing components 128. Here, it is readily apparent that rechargeable battery pack housing 110 also includes a cell holder 600 having a plurality of rechargeable cells 400 interconnected in series not depicted in detail, second housing component 130 directly forming cell holder 600. Cell holder 600 is positioned between the two housing components 120, 130. Rechargeable battery pack housing 110 also includes two lateral components 125 holding first housing component 120 and second housing component 130 and cell holder 600 together in the assembled state in such a way that a detaching of first housing component 120 from second housing component 130, or vice versa, is prevented. Rechargeable battery pack 100 in the embodiment variant depicted in FIG. 11 is designed as a sliding rechargeable battery pack.

The interconnection of rechargeable cells 400 is implemented via cell connectors 500, which enable an electrical interconnection of rechargeable cells 400 in parallel and/or in series. Cell connectors 500 are advantageously already situated directly on circuit board 812 or a contacting of individual rechargeable cells 400 with rechargeable battery pack electronics 800 takes place via additional conductors. Individual rechargeable cells 400 are accommodated spaced apart from one another for mechanical fixation in cell holder 600. Rechargeable battery pack 100 depicted in FIG. 14 also includes rechargeable battery pack electronics 800 having at least one, preferably a plurality, of contact elements 140 for establishing an electrical connection between rechargeable battery pack 100 and hand-held power tool 300, and a circuit board 810. Each contact element 140 is connected to circuit board 810 inside rechargeable battery pack housing 110. Rechargeable battery pack electronics 800 also include a circuit board 812 according to the present invention in the form of a flexible circuit board 812 having multiple contact means 840, which are fastened to cell holder 600 in such a way that they are connected to the microcontroller not depicted.

Figure 15:
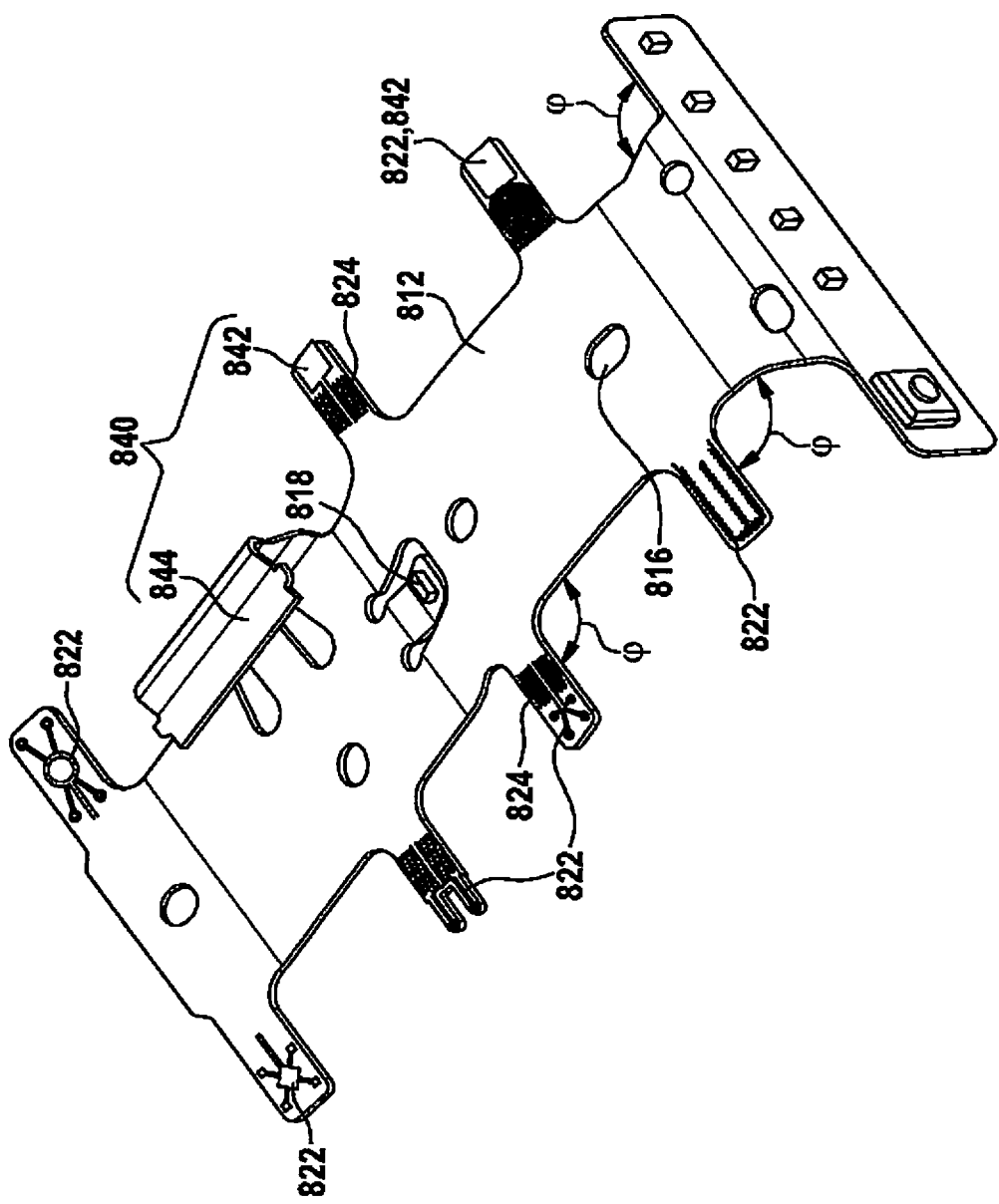
FIG. 15 shows a perspective view of a first specific embodiment of a flexible circuit board.

Flexible circuit board 812 depicted in detail in FIG. 15 exhibits a flexural stiffness, which is designed at least in areas in such a way that a flexural deformation of flexible circuit board 812 is possible in the mounted state, at least in areas. The flexural deformation of flexible circuit board 812 may take place in such a way that a median plane of circuit board 812 is deformed in each case in an area of flexural deformation 843 by an angle φ relative to an original position. In this way, it is possible to variably adapt flexible circuit board 812, as is apparent in FIG. 14, to the geometrical shape of rechargeable battery pack housing 110 or of cell holder 600. Cell holder 600 includes multiple positioning elements 604 to ensure a secure positioning of flexible circuit board 812 on cell holder 600. Positioning elements 604 engage in corresponding recesses 816 of flexible circuit board 812 in the mounted state. Flexible circuit board 812 also includes multiple contact surfaces 822 corresponding to rechargeable cells 400 for electrical contacting with contact partner 149, which is a rechargeable cell 400 in the embodiment variant depicted. In this way, it may be ensured that an electric current may be transferred between circuit board 812 and contact partner 149 or rechargeable cell 400. Thus, it is provided that each contact surface 822 electrically contacts a corresponding rechargeable cell 400 or a contact partner 149, contact surfaces 822 in the embodiment variant depicted in FIGS. 14 through 16 being designed in the form of flexible contact tongues 842, which are inserted into corresponding openings 602 in cell holder 600. As depicted by way of example in FIG. 15, contact surfaces 822 each include structures 824 in the contact area, which are designed to pierce through contaminant layers and/or oxide layers present on contact partner 149 or on rechargeable cell 400.

Figure 16:
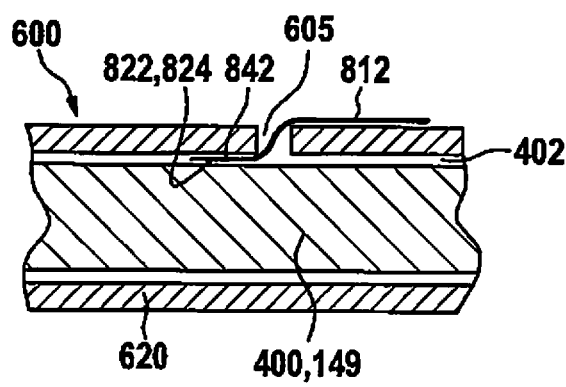
FIG. 16 shows a depiction of a contact tongue introduced into a cell channel of a cell holder.

FIG. 16 shows a contact tongue 842 introduced into an opening of a cell holder 600. Contact tongues 842 are introduced into a cell channel 402 in openings 602 of cell holder 600, contact tongues 842 being deformed by an angle φ relative to an original position when rechargeable cells 400 are introduced. After rechargeable cells 840 are introduced into cell channel 402, contact surface 822 is clamped between the walls of cell channel 402 and rechargeable cell 400. In the process, a relative movement occurs, as previously described, between contact surface 822 of contact tongue 842 and rechargeable cell 400 being introduced due to the introduction of rechargeable cell 400 into cell channel 402, so that contaminant layers and/or oxide layers on rechargeable cell 400 are pierced through. To ensure a good sliding movement, it is provided that second end b of contact tongue 842 is introduced into cell channel 402 in such a way that it is curved toward rechargeable cell 400. As depicted in FIG. 16, the angle φ after being introduced, has a value of approximately 180°, a value between 10° and 200°, preferably a value between 30° and 190°, being possible. Individual rechargeable cells 400 are connected directly to flexible circuit board 812 via contact surfaces 822 on contact tongues 842, structures 824 in the contact area piercing through the contaminant layers and/or oxide layers potentially existing on contact partner 149 or on rechargeable cell 400. In the depicted specific embodiment of a flexible circuit board 812 including two contact surfaces 822 situated opposite one another, a uniform pull occurs in both directions on flexible circuit board 812 when rechargeable cells 400 are introduced into cell channel 402.

In addition to the specific embodiments described and depicted, additional specific embodiments are possible, which may include additional modifications and combination of features.

What is claimed is:

1. A circuit board, comprising:
at least one contact surface for electrical contacting with a contact partner, so that an electric current can be transferred between the circuit board and the contact partner;
structures in at least one contact area, the at least one contact area including the at least one contact surface and the structures being designed to pierce through at least one of: contaminant layers and oxide layers, potentially existing on the contact partner;
at least one first electrically non-conductive layer; and
at least one second electrically conductive layer made of at least one of copper and a copper alloy,
wherein the circuit board also includes material-removing structures, the material-removing structures being suitable for at least partially removing the at least one of the contaminant layers and the oxide layers potentially existing on the contact partner, during a relative movement of the contact partner along the at least one contact area.

2. The circuit board as recited in claim 1, wherein the at least one contact surface, which is electrically conductive, includes divided, web-like strip conductor structures.

3. The circuit board as recited in claim 2, wherein at least a part of the web-like strip conductor structures is implemented with sharp-edged border areas, which are suitable for piercing through the at least one of contaminant layers and the oxide layers potentially existing on the contact partner, at least one of: (i) during a relative movement of the contact partner along the at least one contact area, and (ii) with a little contact pressure between the at least one contact surface and the contact partner.

4. The circuit board as recited in claim 2, wherein the web-like strip conductor structures are situated exposed at least relative to an area of the circuit board immediately surrounding the web-like strip conductor structures.

5. The circuit board as recited in claim 1, wherein the material-removing structures are not used to conduct electric current.

6. The circuit board as recited in claim 1,
wherein the at least one second electrically conductive layer being applied to a first surface of the at least one first electrically non-conductive layer; and further comprising:
at least one third layer made of solder resist, the at least one third layer being applied to a first surface of the at least one second electrically conductive layer;
wherein the material-removing structures are formed by at least one of the first electrically non-conductive layer, at least one of the second electrically conductive layer, and at least one of the third layer.

7. The circuit board as recited in claim 6, wherein the material-removing structures are formed by recesses in the at least one first layer electrically non-conductive layer, the recesses having round-shaped holes, and the circuit board not including a third layer in the at least one contact area.

8. The circuit board as recited in claim 6, wherein the material-removing structures are formed at least partly by exposing isolated areas in the at least one second electrically conductive layer, the isolated areas being triangular-shaped.

9. The circuit board as recited in claim 6, wherein the material-removing structures are formed at least partially by recesses in the at least one third layer, the recesses having the round-shaped holes.

10. The circuit board as recited in claim 6, wherein the material-removing structures are formed at least partially by granular elements, which are sharp-edged, in the at least one second electrically conductive layer, an adhesive surface between the granular elements and the at least one first layer electrically non-conductive layer being dimensioned in such a way that the granular elements are sheared off during a relative movement of the contact partner along the at least one contact area and partially come to rest between the at least one contact surface and the contact partner, where they pierce through the at least one of the contaminant layers and the oxide layers, potentially existing on the contact partner.

11. The circuit board as recited in claim 1, wherein the circuit board is a flexible, pliable, circuit board, at least in sections.

12. A rechargeable battery pack for a hand-held power tool, comprising:
a rechargeable battery pack housing, including at least one first housing component and one second housing component, the rechargeable battery pack housing accommodating at least one rechargeable cell; and
rechargeable battery pack electronics, including at least one contact element for establishing an electrical connection between the rechargeable battery pack and the hand-held power tool, the rechargeable battery pack electronics further including at least one circuit board including at least one contact surface for electrical contacting with a contact partner, so that an electric current can be transferred between the at least one circuit board and the contact partner, and structures in at least one contact area, the at least one contact area including the at least one contact surface and the structures being designed to pierce through at least one of: contaminant layers and oxide layers, potentially existing on the contact partner, at least one first electrically non-conductive layer; and at least one second electrically conductive layer made of at least one of copper and a copper alloy, wherein the circuit board also includes material-removing structures, the material-removing structures being suitable for at least partially removing the at least one of the contaminant layers and the oxide layers potentially existing on the contact partner, during a relative movement of the contact partner along the at least one contact area.

13. The rechargeable battery pack as recited in claim 12, wherein the at least one contact element is connectable to the at least one circuit board via the at least one contact partner, the at least one contact partner being situated on the first housing component in such a way that a relative movement of the at least one contact partner along the at least one contact area of the at least one circuit board is caused when connecting the first housing component to the second housing component, so that the at least one of the contaminant layers and the oxide layers, potentially existing on the at least one contact partner are pierced through.

14. The rechargeable battery pack as recited in claim 12, wherein the at least one contact partner is designed as a guided spring contact.

15. A charging device for charging a rechargeable battery pack, comprising:
a housing for accommodating charging device electronics; and an interface situated on the housing having mating contact elements for electrical or mechanical contacting of contact elements of the rechargeable battery pack;

wherein the housing includes at least one first housing component and one second housing component, the mating contact elements being connected to the charging device electronics via at least one contact partner and the charging device electronics includes at least one circuit board including at least one contact surface for electrical contacting with a contact partner, so that an electric current can be transferred between the at least one circuit board and the contact partner, and structures in at least one contact area, the at least one contact area including the at least one contact surface and the structures being designed to pierce through at least one of: contaminant layers and oxide layers, potentially existing on the contact partner, at least one first electrically non-conductive layer; and at least one second electrically conductive layer made of at least one of copper and a copper alloy, wherein the circuit board also includes material-removing structures, the material-removing structures being suitable for at least partially removing the at least one of the contaminant layers and the oxide layers potentially existing on the contact partner, during a relative movement of the contact partner along the at least one contact area.

16. A hand-held power tool, comprising:

a housing having a handle;

a drive motor situated in the housing for driving a mechanical interface;

first electronics situated in the housing; and a rechargeable battery pack detachably connectable to the hand-held power tool, the rechargeable battery pack being electrically connected to the hand-held power tool in an installed state, the rechargeable battery pack including a rechargeable battery pack housing, including at least one first housing component and one second housing component, the rechargeable battery pack housing accommodating at least one rechargeable cell, and rechargeable battery pack electronics, including at least one contact element for establishing an electrical connection between the rechargeable battery pack and the hand-held power tool, the rechargeable battery pack electronics including at least one circuit board including at least one contact surface for electrical contacting with a contact partner, so that an electric current can be transferred between the at least one circuit board and the contact partner, and structures in at least one contact area, the at least one contact area including the at least one contact surface and the structures being designed to pierce through at least one of: contaminant layers and oxide layers, potentially existing on the contact partner, at least one first electrically non-conductive layer; and at least one second electrically conductive layer made of at least one of copper and a copper alloy, wherein the circuit board also includes material-removing structures, the material-removing structures being suitable for at least partially removing the at least one of the contaminant layers and the oxide layers potentially existing on the contact partner, during a relative movement of the contact partner along the at least one contact area.

17. A tool system, comprising:

at least one rechargeable battery pack;

a hand-held power tool;

a charging device for charging a rechargeable battery pack of the hand-held power tool; and at least one circuit board including at least one contact surface for electrical contacting with a contact partner, so that an electric current can be transferred between the at least one circuit board and the contact partner, and structures in at least one contact area, the at least one contact area including the at least one contact surface and the structures being designed to pierce through at least one of: contaminant layers and oxide layers, potentially existing on the contact partner, at least one first electrically non-conductive layer; and at least one second electrically conductive layer made of at least one of copper and a copper alloy, wherein the circuit board also includes material-removing structures, the material-removing structures being suitable for at least partially removing the at least one of the contaminant layers and the oxide layers potentially existing on the contact partner, during a relative movement of the contact partner along the at least one contact area.

\* \* \* \* \*